United States Patent [19]

Yagi et al.

[11] Patent Number: 4,975,626
[45] Date of Patent: Dec. 4, 1990

[54] SCANNER MOTOR CONTROLLER FOR CONTROLLING THE ROTATING SPEED OF A SCANNER MOTOR

[75] Inventors: Motoi Yagi, Zushi; Shoichi Sato, Tokyo; Yasuo Matsumoto, Shizuoka; Kazunori Murakami, Shizuoka; Tomonori Ikumi, Shizuoka, all of Japan

[73] Assignee: Tokyo Electric Company, Ltd., Tokyo, Japan

[21] Appl. No.: 357,604

[22] Filed: May 26, 1989

[30] Foreign Application Priority Data

May 27, 1988 [JP] Japan ................................ 63-129999
Jul. 5, 1988 [JP] Japan ................................ 63-167099
Jul. 7, 1988 [JP] Japan ................................ 63-169864

[51] Int. Cl.$^5$ ............................................ G05B 19/10
[52] U.S. Cl. ................................ 318/567; 346/160; 346/108; 350/6.8
[58] Field of Search ................ 318/567; 346/160, 108; 350/6.8

[56] References Cited

U.S. PATENT DOCUMENTS 4,410,234 10/1983 Mikami et al. ...................... 350/6.8
4,620,200 10/1986 Fukai ................................... 346/108

Primary Examiner—William M. Shoop, Jr.
Assistant Examiner—Saul M. Bergmann
Attorney, Agent, or Firm—Oblon, Spivak, McClelland, Maier & Neustadt

[57] ABSTRACT

A scanner motor controller for a laser printer or the like having a polygonal rotating mirror rotated by a scanner motor to reflect a laser beam for scanning operation. The scanner motor controller comprises a rotating speed control circuit for controlling the scanner motor for operation at a constant rotating speed on the basis of phase deviation and frequency deviation of a FG pulse signal generated by the scanner motor from a reference clock, and a rotating speed varying circuit for varying the rotating speed of the scanner motor within one turn of the polygonal rotating mirror.

4 Claims, 14 Drawing Sheets

SCANNER MOTOR CONTROLLER FOR CONTROLLING THE ROTATING SPEED OF A SCANNER MOTOR

FIELD OF THE INVENTION AND RELATED ART STATEMENT

The present invention relates to a scanner motor controller for controlling a scanner motor for driving a polygonal rotating mirror which reflects a laser beam for scanning operation in a laser printer or the like.

The applicant of the present patent application proposed a construction for a laser printer as shown in FIG. 14 in Japanese Patent application No. 63-1517. This laser printer is provided with a polygonal rotating mirror 1 driven by a scanner motor for continuous rotation. A laser beam emitted from a signal light source 2 is reflected by the reflecting surfaces 3 each being a nonspherical surface of the polygonal rotating mirror 1, and then the reflected laser beam is focused on the circumference of a photoconductive drum 5.

The scanner motor is controlled so as to operate continuously at a constant rotating speed on the basis of the result of comparison of a pulse signal generated by the scanner motor, for example, a FG pulse signal, and a reference clock generated by a quartz-crystal oscillator. Generally, a PLL control circuit compares the FG pulse signal with the reference clock, and then regulates a driving voltage applied to the scanner motor on the basis of the phase deviation and frequency deviation of the FG pulse signal from the reference clock so that the scanner motor operates at a constant rotating speed.

A scanner motor controller for controlling the rotating speed of the scanner motor will be described with reference to FIG. 15.

A scanner motor 6, a rotating speed control circuit 7, a mixing circuit 8 and a motor driving circuit 9 are connected in a loop.

The rotating speed control circuit 7 comprises a FG synchronizing circuit 10 which receives the FG pulse signal from the scanner motor 6, an AFC timing frequency demultiplier 11 and a lock range detecting circuit 12 and a frequency DA converter 13, which are connected in series in that order, a phase DA converter 14 connected in parallel to the lock range detecting circuit 12 and connected to the mixing circuit 8, a frequency demultiplier 16 connected to the FG synchronizing circuit 10, a reference signal generating circuit 15 having a quartz-crystal oscillator and connected to the frequency demultiplier 16, and a reverse rotation detecting circuit 17 connected to the phase DA converter 14 and the lock range detecting circuit 12.

A reflecting mirror 18, as shown in FIG. 14, is disposed on the path of a laser beam reflected by each reflecting surface 3 of the polygonal rotating mirror 1 and falling on a scanning start position on the circumference of the photoconductive drum 5, and a start position detector 19 is disposed so as to receive a laser beam reflected by the reflecting mirror 18.

When driven for rotation by the motor driving circuit 9, the scanner motor 6 generates a FG pulse signal. The FG pulse signal is compared with a reference signal generated by the reference signal generating circuit 15 by the FG synchronizing circuit 10, and then the scanner motor 6 is controlled for operation at a constant rotating speed on the basis of the result of the comparison. A signal provided by the start position detector 19 is used for deciding the start position of the laser beam reflected by the polygonal rotating mirror 1, namely, a position of the laser beam falling on a scanning start position on the circumference of the photoconductive drum 5.

The polygonal rotating mirror 1 can be rotated at a constant rotating speed by maintaining the scanner motor 6 at a constant rotating speed. However, the scanning speed of the scanning laser beam on the circumference of the photoconductive drum 5 must be constant, and the laser beam must be projected on the photoconductive drum 5 at regular time intervals by the six reflecting surfaces 3 of the polygonal rotating mirror 1 having the shape of a hexagonal prism. Therefore, the regular rotational movement of the polygonal rotating mirror 1 in each turn thereof is essential and the simple control of the rotating speed of the polygonal rotating mirror 1 is unable to make the laser printer function satisfactorily.

The scanning speed varies periodically at a period corresponding to one turn of the polygonal rotating mirror 1 even if the polygonal rotating mirror 1 is rotated at a constant rotating speed, when the center hole of the polygonal rotating mirror 1 is eccentric with respect to the polygonal circumference thereof. Furthermore, the periodical variation of the scanning speed causes variation in scanning distance even if the scanning start position is constant. In such a case, the scanning end position varies periodically and, when the laser printer is operated to draw a straight line along the feed direction, a zigzag line as indicated at A in FIG. 16 is printed and hence the laser printer is unable to print in high print quality. In FIG. 16, transverse direction is the scanning direction and numerals indicated on the left side are the numbers of the sequential scanning lines.

To solve those problems, it has been an ordinary practice to manufacture the parts at a high machining accuracy and assemble the parts at a high assembling accuracy, which increases the cost of the parts and reduces the yield.

OBJECT AND SUMMARY OF THE INVENTION

Accordingly, it is a first object of the present invention to correct periodic errors in scanning speed in every turn of a polygonal rotating mirror attributable to errors in dimensions and attachment of the polygonal rotating mirror.

It is a second object of the present invention to provide a a rotating speed varying circuit in addition to a conventional rotating speed control circuit which controls a scanner motor for operation at a constant rotating speed to correct errors in the rotating speed in each turn of the polygonal rotating mirror.

It is a third object of the present invention to vary the rotating speed of a scanner motor within each turn of the output shaft of the scanner motor according to the output signal of a rotating speed varying circuit.

It is a fourth object of the present invention to vary the rotating speed of of the output shaft of a scanner motor on the basis of time interval between moments of detection of a laser beam reflected by each reflecting surface of a polygonal rotating mirror by two detectors disposed respectively at two positions within the scanning range of the laser beam.

It is a fifth object of the present invention to regulate the rotating speed of a scanner motor in a digital control mode.

In a first aspect of the present invention, a motor driving circuit controlled by a rotating speed control circuit, which compares a FG pulse signal generated by a scanner motor for rotating a polygonal rotating mirror to reflect a laser beam for scanning operation with a reference clock to determine the deviations of the phase and frequency of the FG pulse signal respectively from those of the reference clock and controls the output voltage of the motor driving circuit so that the scanner motor operates at a constant rotating speed, is connected to a rotating speed varying circuit for varying the rotating speed of the scanner motor within one turn of the output shaft of the scanner motor. Thus, the scanner motor is controlled for operation at a constant rotating speed by the rotating speed control circuit, and the rotating speed of the scanner motor is varied within one turn of the polygonal rotating mirror according to a rotating speed varying signal generated by the rotating speed varying circuit to correct variations in scanning distance and scanning speed attributable to mechanical errors in the polygonal rotating mirror so that the scanning beam is reflected at a constant period and at a constant scanning speed.

In a second aspect of the present invention, a scanner motor controller for an optical scanning apparatus having a polygonal rotating mirror for reflecting a laser beam for scanning operation and a scanner motor for driving the polygonal rotating mirror for rotation, comprises a motor driving circuit for driving the scanner motor, a rotating speed control circuit which compares a FG pulse signal generated by the scanner motor with a reference clock and controls the motor driving circuit on the basis of the respective deviations of the phase and frequency of the FG pulse signal from the reference clock so that the scanner motor operates at a constant rotating speed, and a rotating speed varying circuit connected to the motor driving circuit to determine a time interval between a moment when a laser beam passes one end of a range swept by the laser beam and a moment when the laser beam passes the other end of the range on the basis of the output signals of detectors for detecting the laser beam, and to provide a rotating speed varying signal on the basis of the time interval. A rotating speed varying signal, provided by the rotating speed varying circuit, is superposed on a control signal, provided by the rotating speed control circuit, to assure that the scanner motor is driven for operation at a constant rotating speed, so that rotating speed of the scanner motor is varied within an angle of rotation for each reflecting surface of the polygonal rotating mirror to correct errors in the scanning operation of the laser beam reflected by each reflecting surface of the polygonal rotating mirror attributable to mechanical errors, such as the eccentric attachment of the polygonal rotating mirror on the output shaft of the scanner motor, in the polygonal rotating mirror, so that the laser beam is reflected to scan at a constant period and a constant scanning speed through a constant scanning distance and thereby print quality is improved.

In a third aspect of the present invention, a scanner motor controller for an optical scanning apparatus having a polygonal rotating mirror for reflecting a laser beam for scanning operation and a scanner motor for driving the polygonal rotating mirror for rotation comprises: a motor driving circuit for driving the scanner motor; a rotating speed control circuit which compares a FG pulse signal generated by the scanner motor with a reference clock and controls the motor driving circuit on the basis of the phase deviation and frequency deviation of the FG pulse signal from the reference clock so that the scanner motor operates at a constant rotating speed; a start position detector disposed in a range swept by a laser beam to provide a start signal upon the detection of a laser beam; an end position detector disposed at a position in the range to provide an end signal upon the detection of a laser beam; and a motor speed control circuit connected to the motor driving circuit and comprising a block signal memory which counts the number of pulses of the reference clock generated in a period between the start signal and the end signal corresponding to an angle of rotation of the polygonal rotating mirror for each reflecting surface thereof and stores the number of pulses of the reference clock as scanning speed data, a phase and amplitude regulating circuit which regulates the phase and amplitude of a jitter correction signal produced through the digital-to-analog conversion of the scanning speed data stored in the block signal memory, and a comparator which compares two successive scanning speed data. The rotating speed control circuit controls the scanner motor for operation at a constant rotating speed, while a rotating speed varying signal produced by the motor speed control circuit is superposed on a control signal provided by the rotating speed control circuit, so that the rotating speed of the scanner motor is varied within each turn of the polygonal rotating mirror to correct errors in the scanning period, scanning speed and scanning distance of the laser beam reflected by the polygonal rotating mirror attributable to mechanical errors in the polygonal rotating mirror. Thus the laser beam reflected by the polygonal rotating mirror scans the circumference of a photoconductive drum at a constant period and at a constant scanning speed through a constant scanning distance to print in high print quality.

BRIEF DESCRIPTION OF THE DRAWINGS

The above and other objects, features and advantages of the present invention will become apparent from the following description taken in conjunction with the accompanying drawings, in which.

DETAILED DESCRIPTION OF THE PREFERRED EMBODIMENTS

Figure 1:
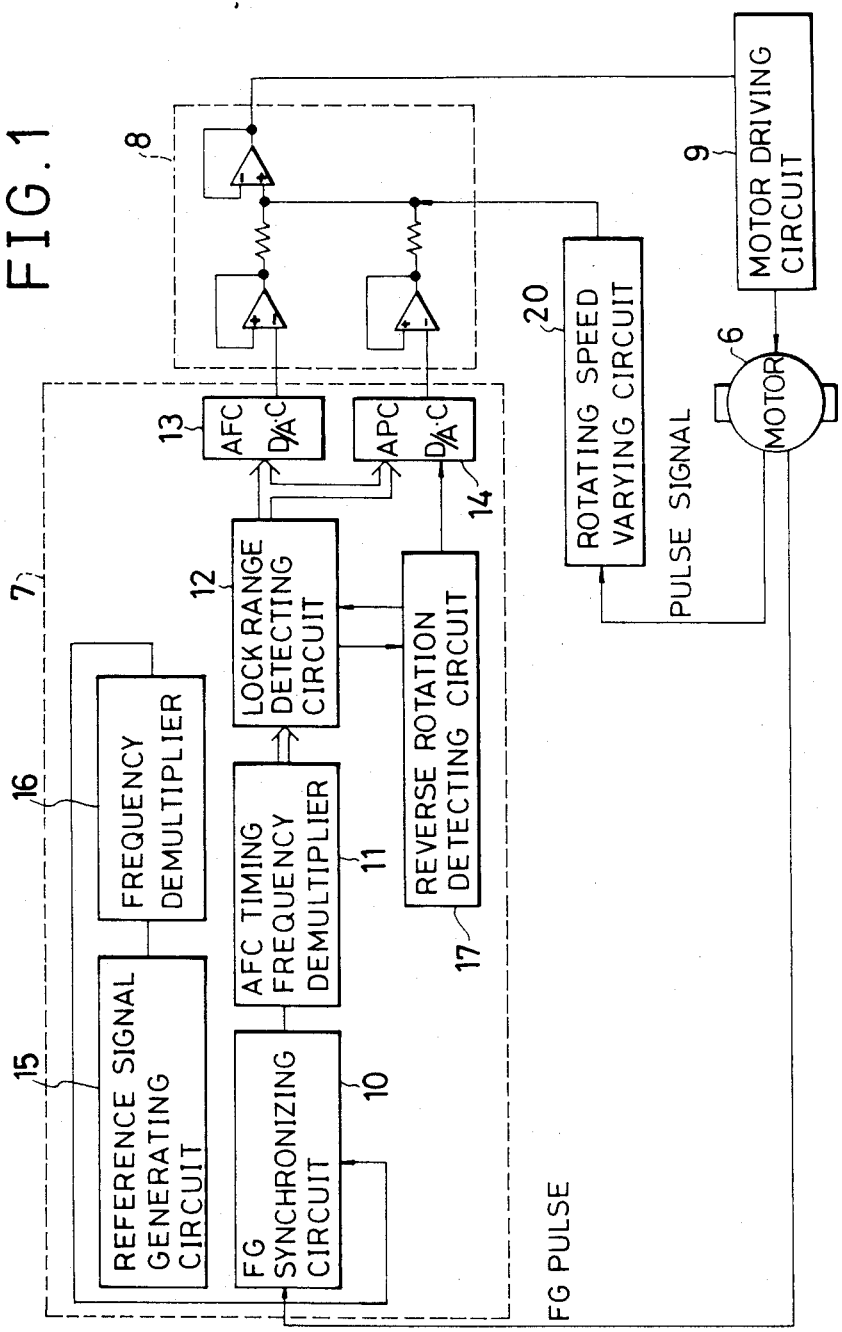
FIG. 1 is a block diagram of a scanner motor controller in a first embodiment according to the present invention.
Figure 2:
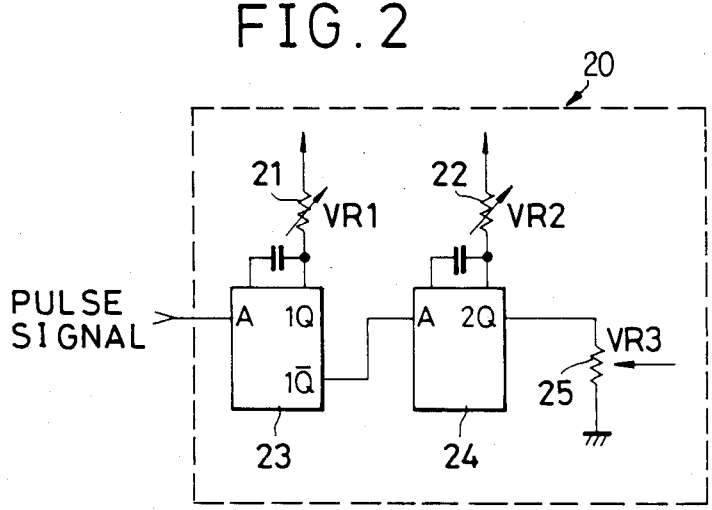
FIG. 2 is a circuit diagram of a rotating speed varying circuit included in the scanner motor controller of FIG. 1.
Figure 3:
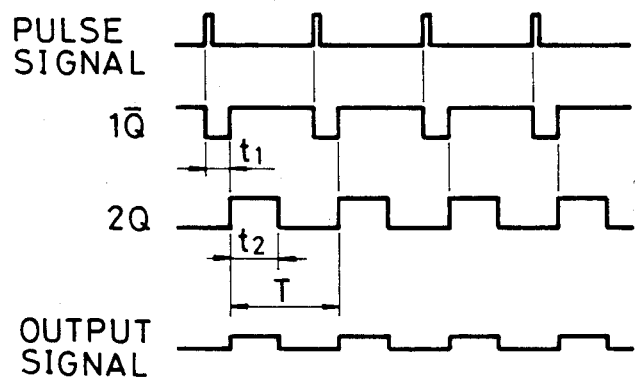
FIG. 3 is a time chart of assistance in explaining the function of the scanner motor controller of FIG. 1.

First Embodiment (FIGS. 1 to 3)

An optical scanning system associated with a scanner motor controller in a first embodiment according to the present invention is similar in construction to that described previously with reference to FIG. 14, and hence the description thereof will be omitted.

Referring to FIG. 1, the scanner motor controller comprises a rotating speed control circuit 7, a mixing circuit 8, a motor driving circuit 9, and a rotating speed varying circuit 20. A scanner motor 6 is included in the loop of the rotating speed control circuit 7, the mixing circuit 8 and the motor driving circuit 9.

As seen in FIG. 1, the rotating speed control circuit 7 comprises a FG synchronizing circuit 10 which receives a FG pulse signal from the scanner motor 6, an automatic frequency control (AFC) timing frequency demultiplier 11 and a lock range detecting circuit 12, which are connected in series in that order. Also included are a frequency DA converter 13 and a phase DA converter 14, which are connected in parallel and to the mixing circuit 8, a frequency demultiplier 16 connected to the FG synchronizing circuit 10, a reference clock generating circuit 15 having an output connected to the frequency demultiplier 16, and a reverse rotation detecting circuit 17 connected to the lock range detecting circuit 12 and the phase DA converter 14.

A rotating speed varying circuit 20 is connected to the scanner motor 6 and the mixing circuit 8. As best seen in FIG. 2, the rotating speed varying circuit 20 consists of two monostable multivibrators 23 and 24, variable resistors 21 (VR1) and 22 (VR2) connected respectively to the monostable multivibrators 23 and 24, and a variable resistor 25 (VR3) connected to output of 20 of the monostable multivibrator 24.

When driven by the motor driving circuit 9, the scanner motor 6 generates a FG pulse signal. The FG synchronizing circuit 10 compares the FG pulse signal with a reference clock generated by the reference clock generating circuit 15. The scanner motor 6 is controlled for operation at a constant rotating speed on the basis of the result of the comparison.

The polygonal rotating mirror 1 is rotated by the scanner motor 6 thus controlled to reflect a scanning beam, and the condition of the scanning beam is detected. As mentioned above, the scanning beam is not necessarily reflected in a constant condition even if the polygonal mirror 1 is rotated uniformly at a constant rotating speed. Accordingly, the variable resistors 21 and 22 are adjusted to make the rotating speed varying circuit 20 generate a rotating speed varying signal to vary the rotating speed of the scanner motor 6 within one turn of the polygonal rotating mirror 1 so that variations in the scanning beam attributable to mechanical errors in the polygonal rotating mirror 1 are cancelled. The scanner motor 6 is provided with a signal generator, not shown, using a Hall element or the like to generate a pulse every turn of the output shaft thereof. As best seen in FIG. 3, the monostable multivibrator 23 is actuated at the leading edge or trailing edge of the pulse generated by the signal generator of the scanner motor 6 to generate a pulse at output 1Q having a pulse width of $t_1$. The monostable multivibrator 24 is actuated by the pulse generated at the output 1Q by the monostable multivibrator 23 to generate a pulse at output 2Q of the multivibrator 24 having a pulse width of 24 $t_2$. Then the variable resistor 22 is adjusted so that $t_2/T$ (where T is the period of the pulse signal generated at the output 20 by the monostable multivibrator 24) is approximately ½. The output level of the rotating speed varying circuit 20 is adjusted by the variable resistor 25.

Figure 6:
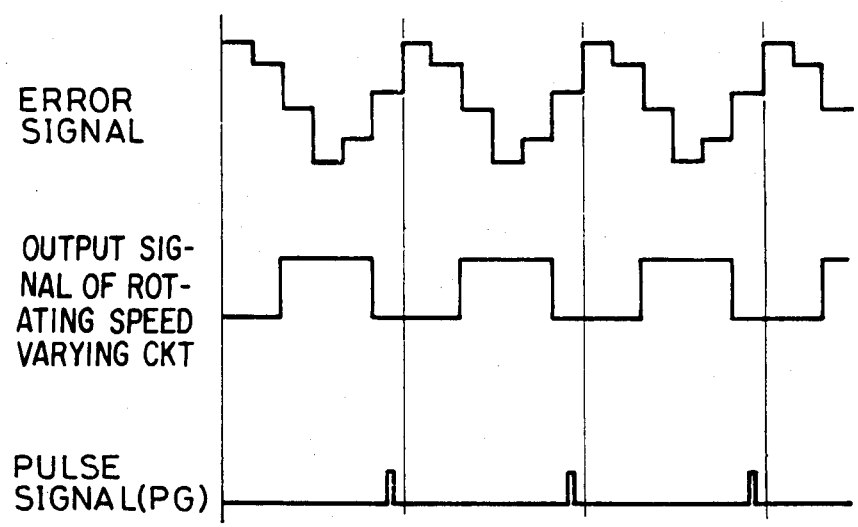
FIG. 6 is a waveform chart showing an error signal and a corresponding output signal of a rotating speed varying circuit of 50% in duty factor.

A rotating speed varying signal produced by the rotating speed varying circuit 20 is superposed on a rotating speed control signal produced by the rotating speed control circuit 7 to vary the rotating speed of the scanner motor 6 within every turn of the polygonal rotating mirror 1. Since $t_2/T$ is approximately ½, the duty factor of the output signal of the rotating speed varying circuit 20 is 50%, so that rotating speed of the polygonal rotating mirror 1 is controlled smoothly by acceleration during half a turn and deceleration during a half a turn. FIG. 6 shows an error signal and a corresponding rotating speed varying signal generated when the rotating speed of the polygonal rotating mirror varies periodically. Thus, errors in the scanning speed of the scanning beam are cancelled.

Figure 4:
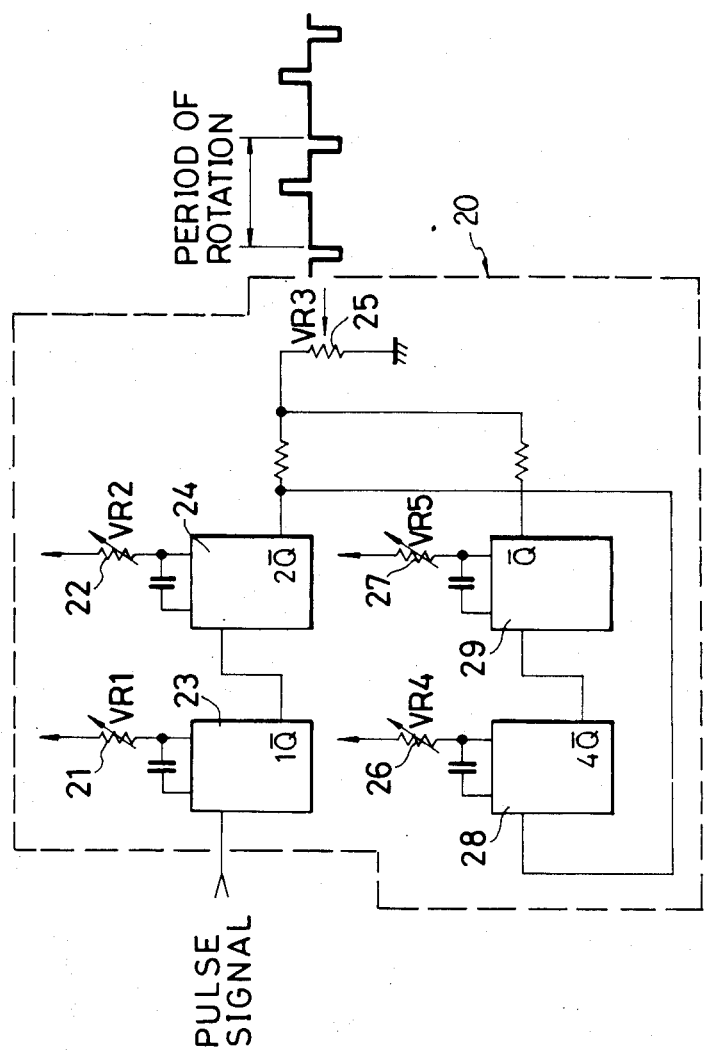
FIG. 4 is a circuit diagram of a rotating speed varying circuit included in a scanner motor controller in a second embodiment according to the present invention.
Figure 5:
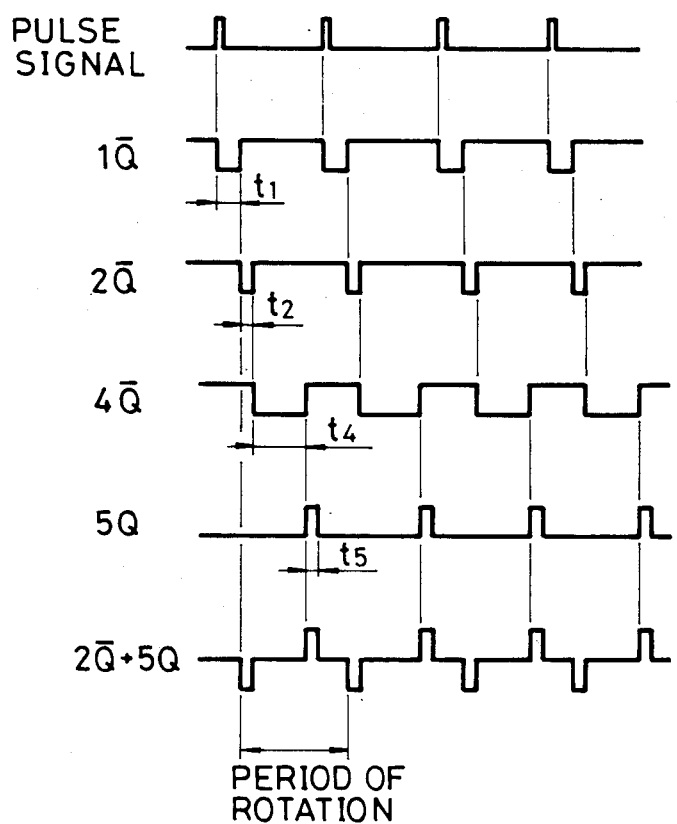
FIG. 5 is a time chart for assistance in explaining the function of the scanner motor controller in the second embodiment according to the present invention.

Second Embodiment (FIGS. 4 and 5)

Figure 7:
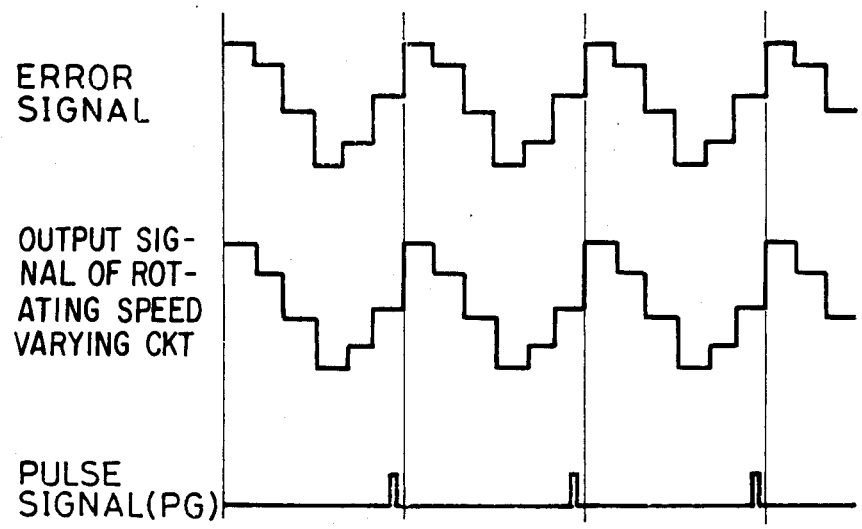
FIG. 7 is a waveform chart showing an error signal and a corresponding control signal having the same width and the same amplitude as the error signal.

A scanner motor controller in a second embodiment according to the present invention is substantially the same in construction as the scanner motor controller of the first embodiment illustrated in FIG. 1, except that the scanner motor controller in the second embodiment is provided additionally with monostable multivibrators 28 and 29 provided respectively with variable resistors 26 (VR4) and 27 (VR5) and connected to the output of the monostable multivibrator 22 as best seen in FIG. 4. Thus, the rotating speed varying circuit 20 of the scanner controller in the second embodiment provides an acceleration and deceleration pulse signal. As seen in FIG. 5, pulse width $t_4$ at output 4Q of monostable multivibrator 28 is adjusted by the variable resistor 26, and the pulse width $t_5$ at output 5Q of multivibrator 29, is adjusted by the variable resistor 27. The waveform of the output signal of the rotating speed varying circuit 20 is the same as the error signal. Shown in FIG. 7, in pulse width and amplitude. Thus, the rotating speed of the polygonal mirror 1 is regulated subtly within every turn of the polygonal rotating mirror 1.

Third Embodiment (FIGS. 8 to 11)

A scanner motor controller in a third embodiment according to the present invention is substantially the same in construction as those of the foregoing embodiments described above and hence parts like or corresponding to those previously described with reference to FIGS. 1, 2 and 4 are denoted by the same reference characters and the description thereof will be omitted.

Figure 9:
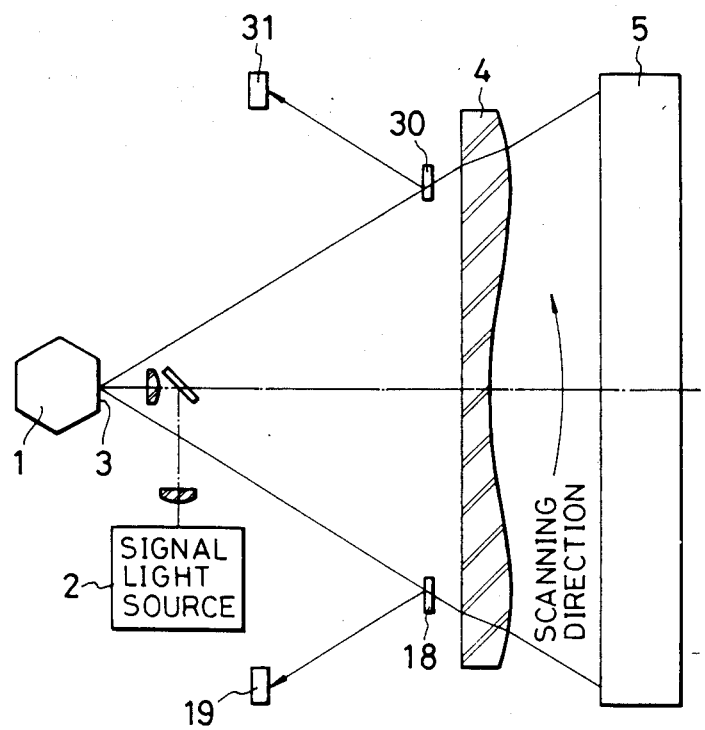
FIG. 9 is a schematic plan view of the optical system of an optical scanning device.
Figure 14:
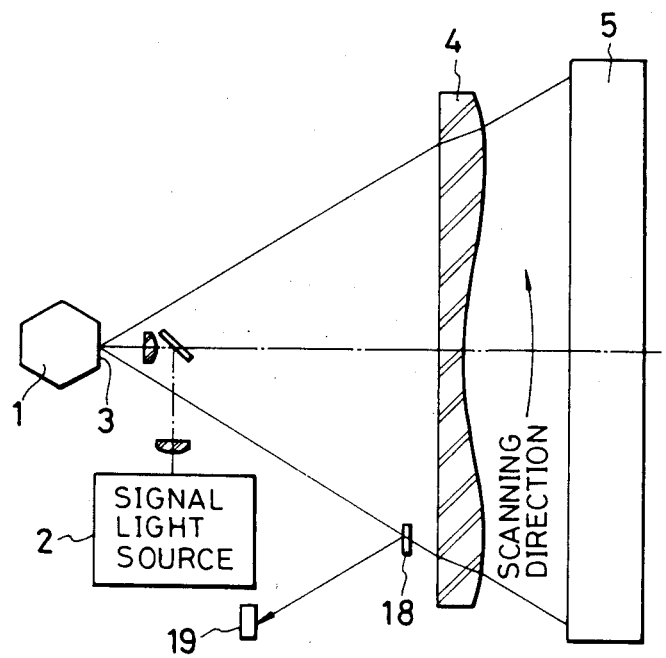
FIG. 14 is a schematic plan view of the optical system of a conventional optical scanning device.

As best shown in FIG. 9, an optical system associated with the scanner motor controller in the third embodiment is provided, in addition to the components of the optical system shown in FIG. 14, with a reflecting mirror 30, which is disposed at the scanning end position of the scanning beam.

Figure 8:
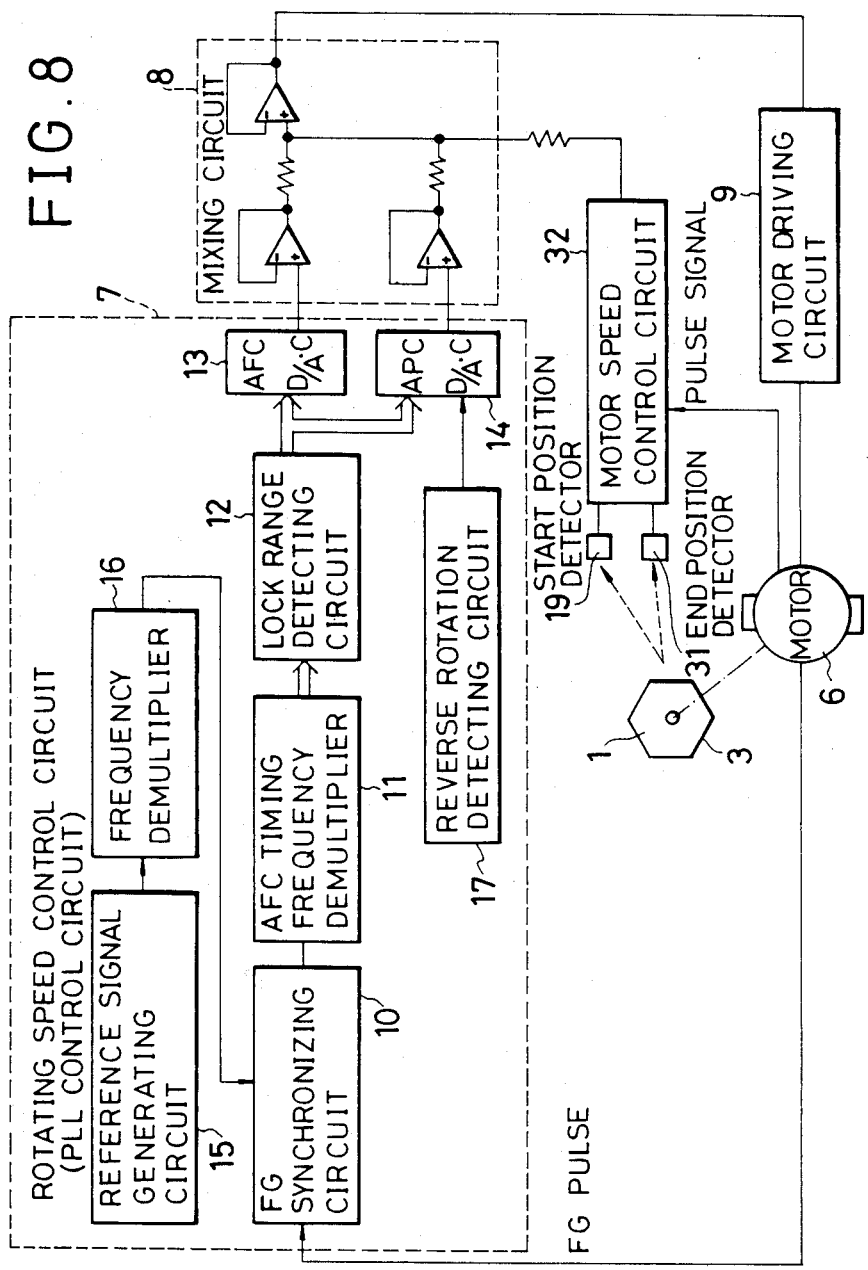
FIG. 8 is a block diagram of a scanner motor controller in a third embodiment according to the present invention.
Figure 15:
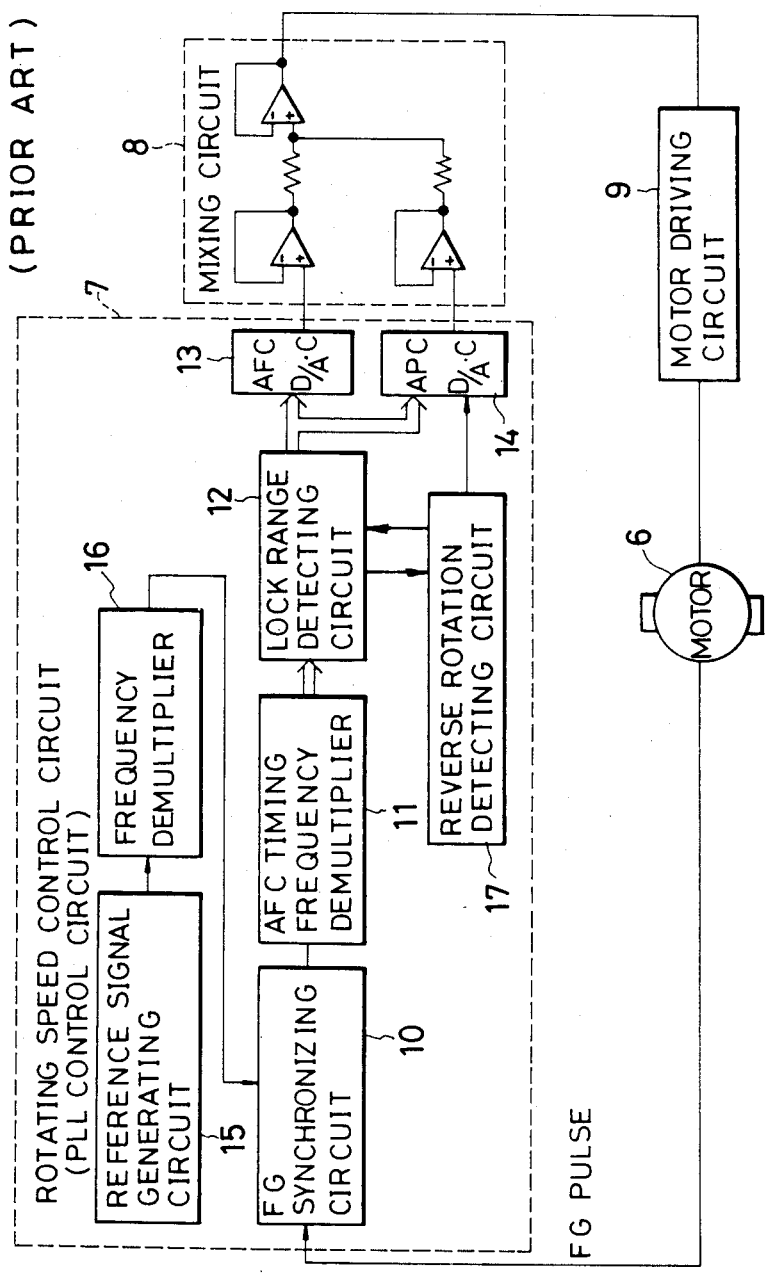
FIG. 15 is a block diagram of a scanner motor controller for controlling the scanner motor of the optical system of FIG. 14.
Figure 16:
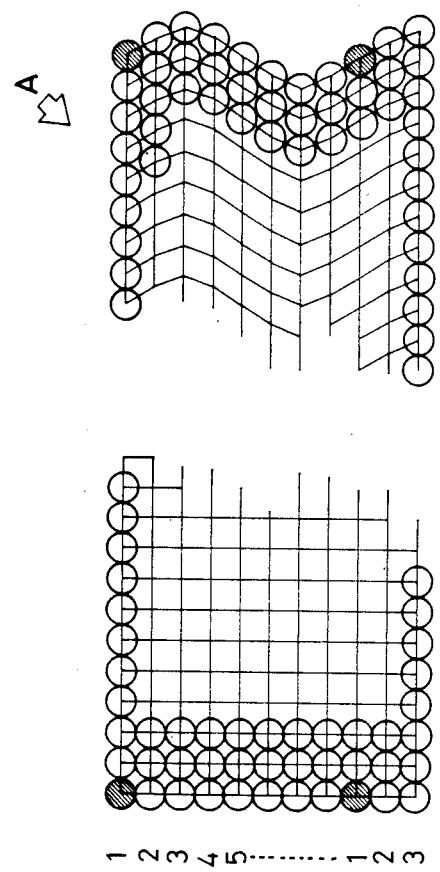
FIG. 16 is an illustration of assistance in explaining the arrangement of dots printed by the faulty printing operation of a conventional optical printer.

As best seen in FIG. 8, the scanner motor controller comprises, in addition to the components of the scanner motor controller shown in FIG. 15, an end position detector 31 disposed so as to receive the scanning beam reflected by the reflecting mirror 30. Also included are a motor speed control circuit 32 connected to the pulse signal generating circuit, not shown, of the scanner motor 6, as well as to each of the start position detector 19, the end position detector 31 and the mixing circuit 8.

Figure 10:
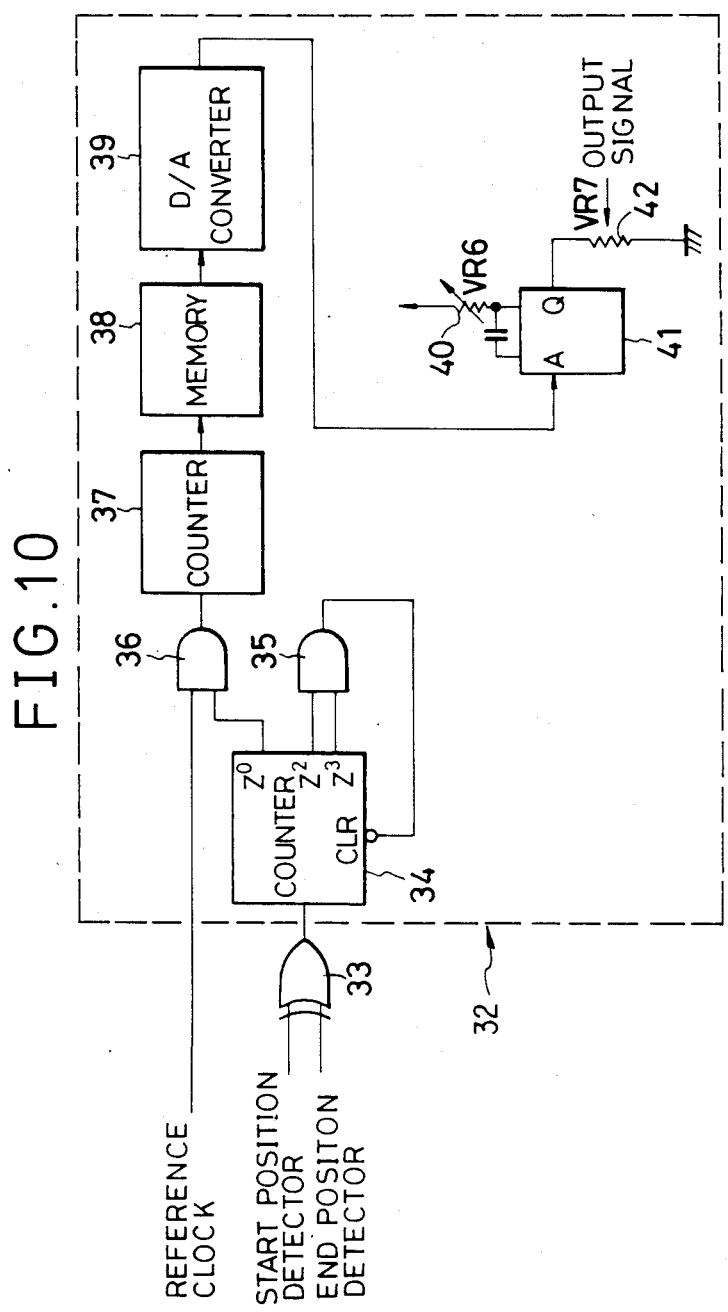
FIG. 10 is a circuit diagram of a motor driving circuit included in the scanner motor controller of FIG. 8.

As shown in FIG. 10, the motor speed control circuit 32 comprises an exclusive OR circuit 33 having input terminals connected respectively to the start position detector 19 and the end position detector 31; a first counter 34 having an input terminal connected to the output terminal of the exclusive OR circuit 33; an AND gate 35 having input terminals connected respectively to the $Z^2$ terminal and the $Z^3$ terminal of the first counter 34, and an output terminal connected to the CLEAR terminal of the first counter 34; an AND gate 36 having input terminals connected respectively to the $Z^0$ terminal of the first counter 34 and the reference clock generating circuit 15; a second counter 37 having an input terminal connected to the output terminal of the AND gate 36; a memory 38 having an input terminal connected to the output terminal of the second counter 37, a DA converter 39 having an input terminal connected to the memory 38; a monostable multivibrator 41 connected to a variable resistor 40 (VR6) and having an input terminal connected to the output terminal of the DA converter 39; and a variable resistor 42 (VR7) connected to the output terminal of the monostable multivibrator 41. The first counter 34 is cleared when the count reaches twelve, provided that the polygonal rotating mirror 1 is a hexagonal rotating mirror, because the first counter counts two pulses, i.e., a start pulse and an end pulse, for each reflecting surface of the polygonal rotating mirror 1.

In accordance with the circuit arrangement shown in FIG. 8, when driven by the motor driving circuit 9, the scanner motor 6 generates a FG pulse signal. The FG synchronizing circuit 10 compares the FG pulse signal with a reference clock generated by the reference clock generating circuit 15, and the scanner motor controller controls the scanner motor 6 on the basis of the comparison so that the scanner motor 6 operates at a constant rotating speed.

Figure 11:
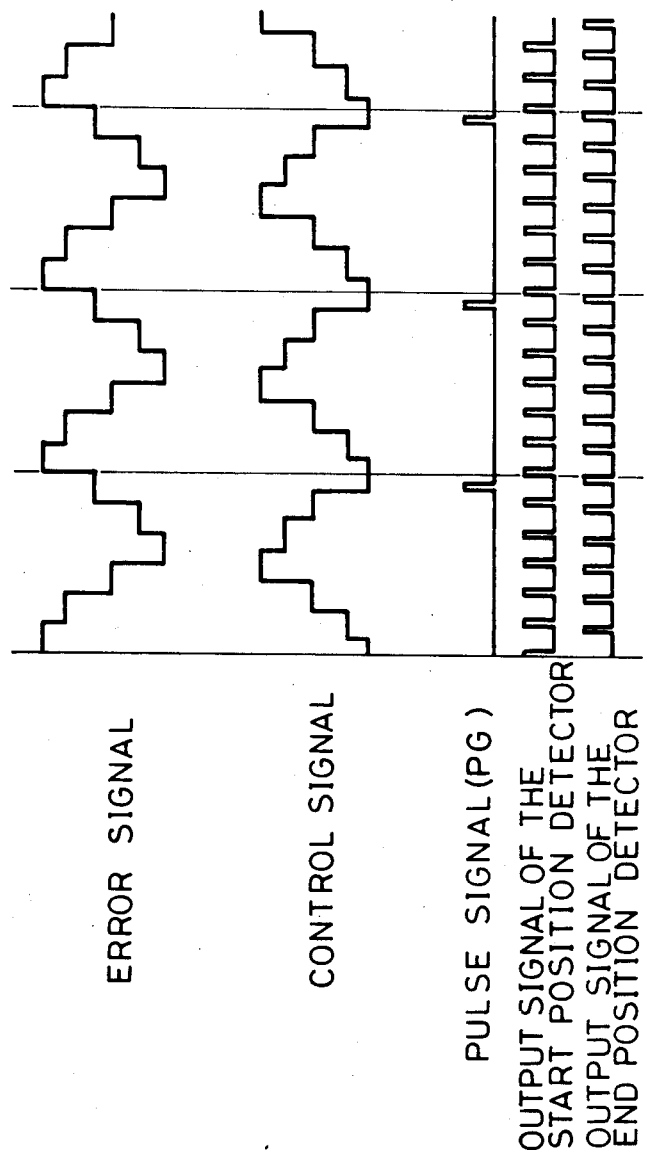
FIG. 11 is a waveform chart showing an error signal and a corresponding control signal.

As mentioned above, the scanning condition of the scanning beam is not necessarily constant even if the polygonal rotating mirror 1 is rotated uniformly at a constant rotating speed, because mechanical errors in the polygonal rotating mirror 1 affects the reflecting mode of the polygonal rotating mirror 1. The start position detector 19 and the end position detector 31 give detection signals to the exclusive OR circuit 33 of the motor speed control circuit 32. Then, the exclusive OR circuit 33 gives an output signal to the first counter 34 shown in FIG. 10. The first counter 34 is cleared at the sixth end pulse (twelfth output signal of the first counter 34). An output signal which appears at the $Z^0$ terminal of the first counter 34 corresponds to a time interval between a moment when the scanning beam is detected by the start position detector 19 and a moment when the scanning beam is detected by the end position detector 31. The logical product of the output signal and the reference clock, namely, a time interval signal for the corresponding reflecting surface 3 of the polygonal rotating mirror 1, is applied to the second counter 37 and then the time interval signal is stored in the memory 38. The DA converter 39 produces a stepped disturbance signal corresponding to frequency through the F/V conversion of the time interval signals as shown in FIG. 11. The disturbance signal is applied to the motor driving circuit 9 as a value corresponding to the scanning speed in the precedent scanning cycle. The disturbance signal is applied to the motor driving circuit 9 at an appropriate phase according to the frequency characteristics of the scanner motor 6 so that errors in the scanning speed for each reflecting surface 3 are cancelled. FIG. 11 shows an example of such a control mode, in which a control signal cancelling the error signal is applied to the motor driving circuit 9.

Thus, the disturbance signal corresponding to the irregularity in the scanning speed in the preceding turn of the polygonal rotating mirror is used to modify a control signal provided by the rotating speed control circuit 7 (PLL control circuit) to diminish irregularity in the scanning speed. Consequently, all the scanning beams reflected by the reflecting surfaces 3 of the polygonal rotating mirror 1 fall on the circumference of the photoconductive drum 5 substantially at the same scanning end position though dots may be dislocated locally from the correct position within the scanning range.

Figure 12:
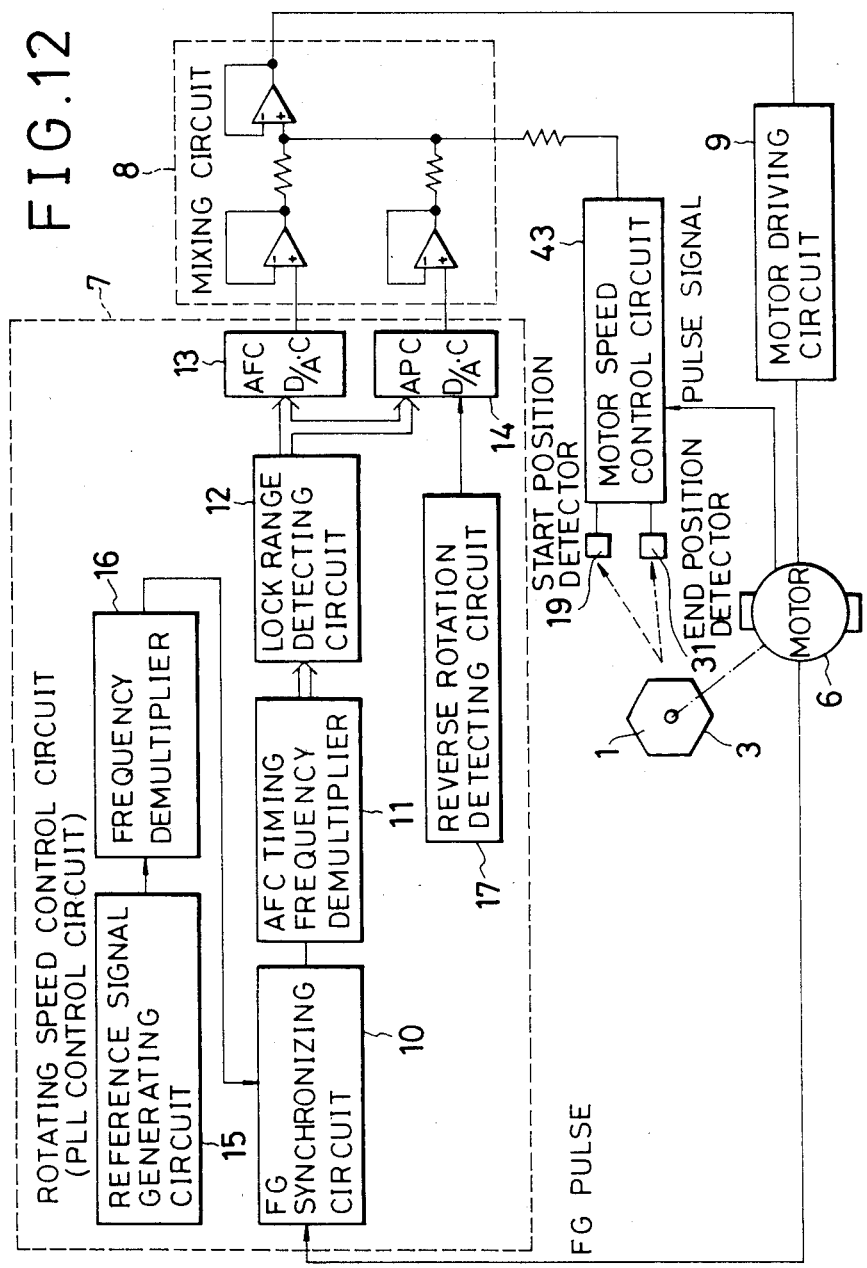
FIG. 12 is a block diagram of a scanner motor controller in a fourth embodiment according to the present invention.
Figure 13:
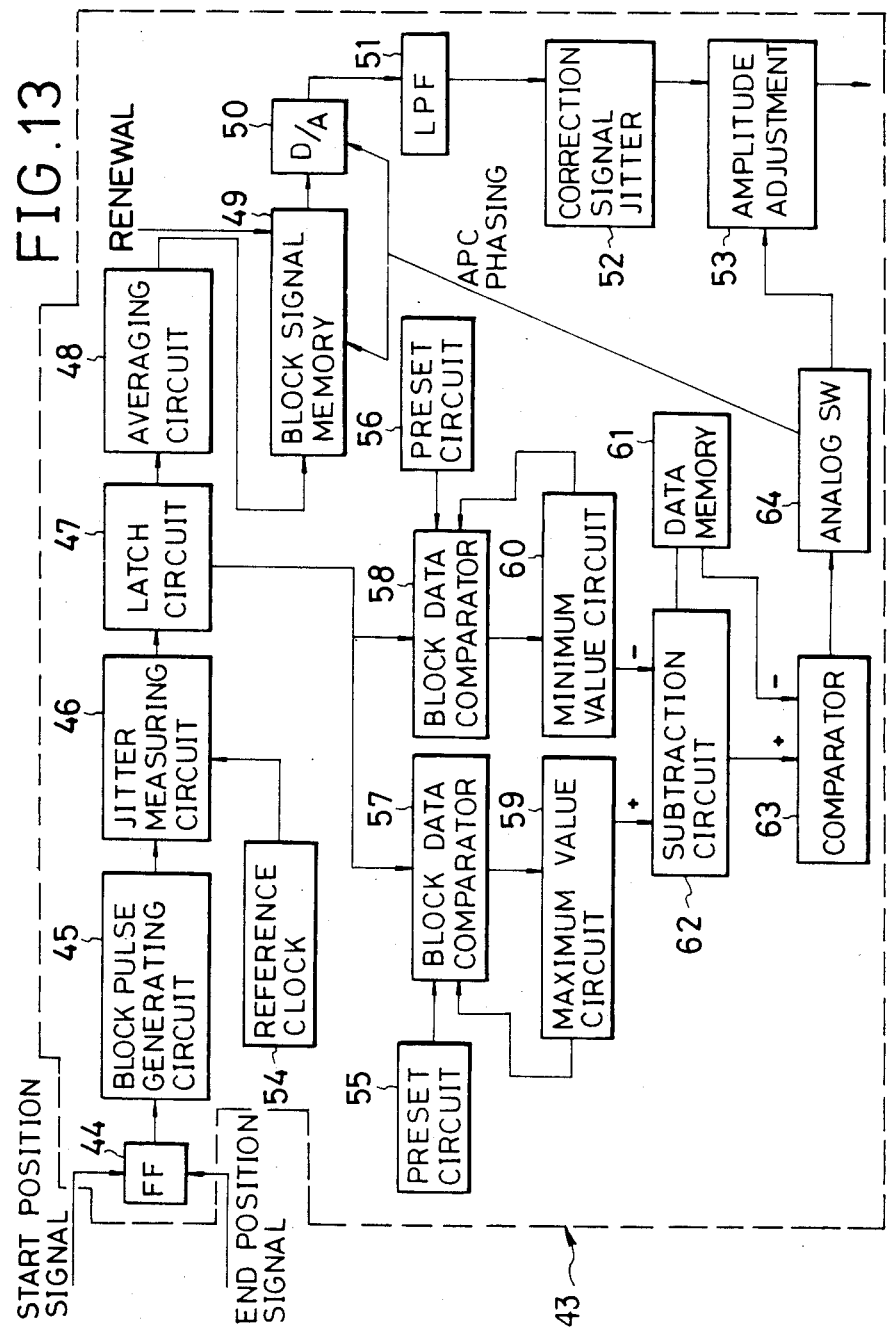
FIG. 13 is a block diagram of a motor speed control circuit included in the scanner motor controller of FIG. 12.

Fourth Embodiment (FIGS. 12 and 13)

A scanner motor controller in a fourth embodiment according to the present invention will be described hereinafter with reference to FIG. 12 and 13, in which parts like or corresponding to those previously described in conjunction with the foregoing embodiments are denoted by the same reference characters and the description thereof will be omitted.

An optical system associated with the scanner motor controller in the fourth embodiment is provided, in addition to the components shown in FIG. 14, with a reflecting mirror 30 at the scanning end position of the scanning beam as shown in FIG. 9.

The scanner motor controller comprises, in addition to the components shown in FIG. 15, a scanning end position detector 31 which receives the scanning beam reflected by the reflecting mirror 30 to detect the arrival of the scanning beam at the scanning end position, and a motor speed control circuit 43 having input terminals connected to the start position detector 19, the end position detector 31 and the scanner motor 6, and an output terminal connected to the mixing circuit 8, which in turn is connected to the motor driving circuit 9.

As shown in FIG. 13, the motor speed control circuit 43 comprises: a flip-flop 44, a block pulse generating circuit 45, a jitter measuring circuit 46, a latch circuit 47, an averaging circuit 48, a block signal memory 49, a DA converter 50, a low-pass filter 51, a jitter correction circuit 52 and an amplitude adjustment circuit 53, which are connected in series in that order. The amplitude adjustment circuit 53 is connected to the mixing circuit 8. A reference clock generating circuit 54 which generates a reference clock is connected to the jitter measurement circuit 46.

Preset circuits 55 and 56 set for the scanning speed data stored in the block signal memory 49 are connected respectively to block data comparators 57 and 58. The block data comparators 57 and 58 are connected to the latch circuit 47 and respectively to a maximum value circuit 59 and a minimum value circuit 60. The maximum value circuit 59 and the minimum value circuit 60 are connected to a subtraction circuit 62, which in turn is connected to a data memory 61 and a comparator 63. The comparator 63 is connected through an analog switch 64 to the block signal memory 49, the DA converter 50 and the amplitude adjustment circuit 53.

As mentioned above, the scanning condition of the scanning beam is not necessarily constant even if the polygonal rotating mirror 1 is rotated uniformly at a constant rotating speed, because the scanning condition of the scanning beam is affected by mechanical errors in the polygonal rotating mirror 1. The arrival of the scanning beam at the scanning start position and at the scanning end position is detected by the start position detector 19 and the end position detector 31. The block pulse generating circuit 45 generates a block pulse signal in response to detection signals provided by the start position detector 19 and the end position detector 31. A time interval in which the block pulse signal is HIGH is measured in a digital mode by using the reference clock. Then, only the rotating speed control circuit 7 functions, and the averaging circuit 48 averages errors in scanning speed for the reflecting surfaces 3 to obtain a mean error and stores the mean error in the block signal memory 49 before the motor speed control circuit 43 functions. The scanning speed data is converted into a corresponding analog signal by the DA converter 50, the analog signal is filtered by the low-pass filter 51 to obtain a jitter correction signal by the jitter correction circuit 52. Then, the jitter correction signal is applied through the amplitude adjustment circuit 53 to the mixing circuit 8 to control the rotating speed of the scanner motor. The scanning speed of the scanning beam reflected by each reflecting surface 3 of the polygonal rotating mirror 1 provided by the latch circuit 47 is compared with the preset scanning speed of the laser beam reflected by the same reflecting surface 3 in the preceding scanning cycle, the difference between the maximum and the minimum within the block is determined by the subtraction circuit 62, the difference is compared with the data of the preceding sector by the comparator 63, and then the rotating speed of the scanner motor 6 is controlled so that the phase and amplitude are corrected to optimum values. That is, the phase and the amplitude are adjusted in a digital mode so that the absolute value of the difference between the maximum and the minimum within the block is reduced to a minimum.

Initial data stored in the preset circuits 55 and 56 or in the block signal memory 49 may be a scanning speed data stored in a ROM or the like in assembling the scanner motor controller as a fixed constant. However, since the scanning speed is subject to variation due to the aging of the optical system and variation in the ambient condition, it is desirable to renew the initial data in setting the printer or before starting the printing operation. In renewing the initial data, data must be processed only by the rotating speed control circuit 7 while the motor speed control circuit 43 is disconnected from the mixing circuit 8.

What is claimed is:

1. A scanner motor controller for controlling the rotating speed of a scanner motor for rotating a polygonal rotating mirror for reflecting a laser beam for scanning operation, comprising:

a rotating speed control circuit which compares a FG pulse signal generating by the scanner motor with a reference clock and provides a control signal determined on the basis of the phase deviation and frequency deviation of the FG pulse signal from the reference clock;

a motor driving circuit which is connected to the rotating speed control circuit and produces a motor driving voltage corresponding to the control signal given thereto from the rotating speed control circuit to drive the scanner motor for operation at a constant rotating speed; and a rotating speed varying circuit which is connected to the motor driving circuit to vary the rotating speed of the scanner motor within one turn of the polygonal rotating mirror, the rotating speed varying circuit generating an output which is inversely proportional to a speed of the laser beam reflected by each surface of the polygonal rotating mirror across a scanning distance of the scanning operation, the output being applied to the motor driving circuit in phase with a next subsequent scanning of the laser beam by each surface of the polygonal rotating mirror to alter the control signal of the rotating speed control circuit and to provide a constant scanning speed of the reflected laser beam reflected by each surface of the mirror.

2. A scanner motor controller according to claim 1, wherein the rotating speed varying circuit provides an output signal of a waveform having a duty factor of 50%.

3. A scanner motor controller according to claim 1, wherein the rotating speed varying circuit provides the output signal with a waveform having a same pulse width and a same absolute amplitude as a signal representative of a time period for each of the reflected laser beams to cross the scanning distance.

4. A scanner motor controller for controlling the rotating speed of a scanner motor for rotating a polygonal rotating mirror for reflecting a laser beam for scanning operation, comprising:

a rotating speed control circuit which compares a FG pulse signal generated by the scanner motor with a reference clock, and provides a control signal determined on the basis of the phase deviation and frequency deviation of the FG pulse signal from the reference clock;

a motor driving circuit which is connected to the rotating speed control circuit and produces a motor driving voltage corresponding to the control signal given thereto from the rotating speed control circuit to drive the scanner motor for operation at a constant rotating speed;

a start position detector disposed at a scanning start position of a range swept by a laser beam to detect the passage of the laser beam through the scanning start position;

a end position detector disposed at a scanning end position of the range swept by the laser beam to detect the passage of the laser beam through the scanning end position; and a motor speed control circuit connected to the motor driving circuit and comprising: a block signal memory which counts and stores the number of reference clock pulses corresponding to the time interval between a moment when the start position detector provides a detection signal and a moment when the end position detector provides a detection signal as scanning speed data for each reflecting surface of the polygonal rotating mirror; and adjusting circuit which adjusts the phase and amplitude of a jitter correction signal produced through the digital-to-analog conversion of the scanning speed data stored in the block signal memory; and a comparator for comparing the scanning speed data obtained in the preceding scanning cycle and previously stored in the block signal memory and the scanning speed data obtained in the succeeding scanning cycle.

* * * * *